(12) United States Patent
Sekiguchi et al.

(10) Patent No.: US 7,907,084 B2
(45) Date of Patent: Mar. 15, 2011

(54) RADAR DEVICE AND CONTROL METHOD OF RADAR DEVICE

(75) Inventors: Takahiro Sekiguchi, Yokohama (JP); Ichiro Seto, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 137 days.

(21) Appl. No.: 12/404,519

(22) Filed: Mar. 16, 2009

(65) Prior Publication Data

US 2009/0243913 A1  Oct. 1, 2009

(30) Foreign Application Priority Data

Mar. 25, 2008  (JP) ............... P2008-078664

(51) Int. Cl.
*G01S 13/38* (2006.01)
(52) U.S. Cl. ........... 342/85; 342/112; 342/129; 342/200
(58) Field of Classification Search ............ 342/85
See application file for complete search history.

(56) References Cited

U.S. PATENT DOCUMENTS

| | | | | |
|---|---|---|---|---|
| 4,205,314 A | * | 5/1980 | Strauch | 342/87 |
| 4,509,049 A | * | 4/1985 | Haendel et al. | 342/87 |
| 4,568,938 A | * | 2/1986 | Ubriaco | 342/87 |
| 4,628,518 A | * | 12/1986 | Chadwick et al. | 375/334 |
| 5,268,692 A | * | 12/1993 | Grosch et al. | 342/70 |
| 5,625,362 A | * | 4/1997 | Richardson | 342/70 |
| 6,040,796 A | * | 3/2000 | Matsugatani et al. | 342/70 |
| 6,593,874 B2 | * | 7/2003 | Yamashita | 342/118 |
| 6,597,308 B2 | * | 7/2003 | Isaji | 342/70 |
| 7,002,512 B2 | * | 2/2006 | Isaji | 342/159 |
| 7,183,968 B2 | * | 2/2007 | Isaji | 342/70 |
| 7,221,309 B2 | * | 5/2007 | Isaji | 342/70 |
| 7,786,927 B2 | * | 8/2010 | Kondoh | 342/109 |
| 2007/0257834 A1 | * | 11/2007 | Tiebout | 342/175 |
| 2008/0299933 A1 | * | 12/2008 | Chang et al. | 455/307 |

FOREIGN PATENT DOCUMENTS

| JP | 10-319113 | | 12/1998 |
|---|---|---|---|
| JP | 2004085452 A | * | 3/2004 |

* cited by examiner

*Primary Examiner* — Thomas H Tarcza
*Assistant Examiner* — Matthew M Barker
(74) *Attorney, Agent, or Firm* — Turocy & Watson, LLP

(57) ABSTRACT

This radar device includes: a transmitter to transmit a transmitting signal whose frequency is periodically increased/decreased at a predetermined rate of change; a mixer to generate a beat signal by multiplying a received signal being transmitted by the transmitter and reflected back from an object to be detected and the transmitting signal; a frequency detector to detect a frequency of the beat signal; and a controller to control the rate of change of the frequency of the transmitting signal so that the frequency of the beat signal detected by the frequency detector becomes equal to or larger than a cut-off frequency of a flicker noise caused by the mixer.

6 Claims, 6 Drawing Sheets

RADAR DEVICE AND CONTROL METHOD OF RADAR DEVICE

CROSS-REFERENCE TO RELATED APPLICATIONS

This application is based upon and claims the benefit of priority from the prior Japanese Patent Application No. 2008-078664, filed on Mar. 25, 2008; the entire contents of which are incorporated herein by reference.

BACKGROUND OF THE INVENTION

1. Field of the Invention

The present invention relates to a radar, and particularly relates to an FMCW radar.

2. Description of the Related Art

A safety of automobile has been regarded as important in recent years, and an on-vehicle millimetric wave radar for avoiding collision and the like, for instance, has been prospected to be used broadly as one of the techniques for improving the safety. For a radar to be used as the on-vehicle radar or the like, an FMCW radar can be cited.

The FMCW radar is a radar which FM-modulates a carrier wave to make it a transmitting signal, and performs reception by using a signal being a branched transmitting signal as a local signal for down-conversion at the time of reception. When the transmitting signal from the radar hits an object and the radar receives the reflected signal, a beat with a frequency in proportion to a delay time in accordance with a distance to the object can be obtained. The FMCW radar measures the distance and a relative speed to the object using the beat frequency.

Incidentally, in a device using a semiconductor element, there exists a noise called a flicker noise with low frequency. This is a noise caused by a fluctuation of carrier or the like due to an impurity on a crystal interface inside the semiconductor. Normally, the flicker noise becomes more dominant than a white thermal noise at about 1 MHz or under (hereinafter, a frequency at which the flicker noise generally becomes more dominant than the white noise is called "cut-off frequency of flicker noise"), and is also called as 1/f noise because of its frequency characteristic. When a close distance is detected in the FMCW radar, since the beat frequency is generated at a relatively low frequency, there is a problem that an S/N ratio (SNR) is deteriorated due to the flicker noise.

As a method of preventing the deterioration of SNR due to the flicker noise, there is known a technique in which a flicker noise generated by a mixer at a high frequency side is avoided by performing down-conversion in two times (refer to JP-A 10-319113 (KOKAI)).

SUMMARY OF THE INVENTION

However, the conventional technique for avoiding the flicker noise has problems that there is a need to provide a band-pass filter having a steep characteristic at an intermediate frequency band (IF band: several tens GHz band) of a radar, a noise which cannot be completely eliminated at a further low frequency side than a desired band is folded back to be added, and a flicker noise generated by a mixer at the low frequency side cannot be removed.

The present invention has been made to solve such problems, and an object thereof is to provide a radar device capable of effectively removing an influence of flicker noise without necessitating an expensive IF band band-pass filter and a control method of the radar device.

In order to achieve the aforementioned object, a radar device according to one aspect of the present invention includes: a transmitter to transmit a transmitting signal whose frequency is periodically increased/decreased at a predetermined rate of change; a mixer to generate a beat signal by multiplying a received signal being transmitted by the transmitter and then reflected back from an object to be detected and the transmitting signal; a frequency detector to detect a frequency of the beat signal; and a controller to control the rate of change of the frequency of the transmitting signal so that the frequency of the beat signal detected by the frequency detector becomes equal to or larger than a cut-off frequency of a flicker noise caused by the mixer.

A control method of a radar device according to another aspect of the present invention is characterized in that it includes: transmitting a transmitting signal whose frequency is periodically increased/decreased at a predetermined rate of change; generating a beat signal by multiplying a received signal being transmitted as the transmitting signal reflected back from an object to be detected and the transmitting signal using a mixer; detecting a frequency of the beat signal; and controlling the rate of change of the frequency of the transmitting signal so that the frequency of the beat signal becomes equal to or larger than a cut-off frequency of a flicker noise caused by the mixer.

DESCRIPTION OF THE EMBODIMENTS

In order to suppress an effect on a beat caused by a flicker noise in an FMCW radar, it is required to set a beat frequency to be equal to or higher than a cut-off frequency of flicker noise. In the present invention, the beat frequency is made to be equal to or higher than the cut-off frequency of flicker noise in consideration of a rate of change of frequency of the FMCW radar, to thereby suppress the influence caused by the flicker noise.

Hereinafter, one embodiment of the present invention will be described in detail with reference to the drawings.

Figure 1:
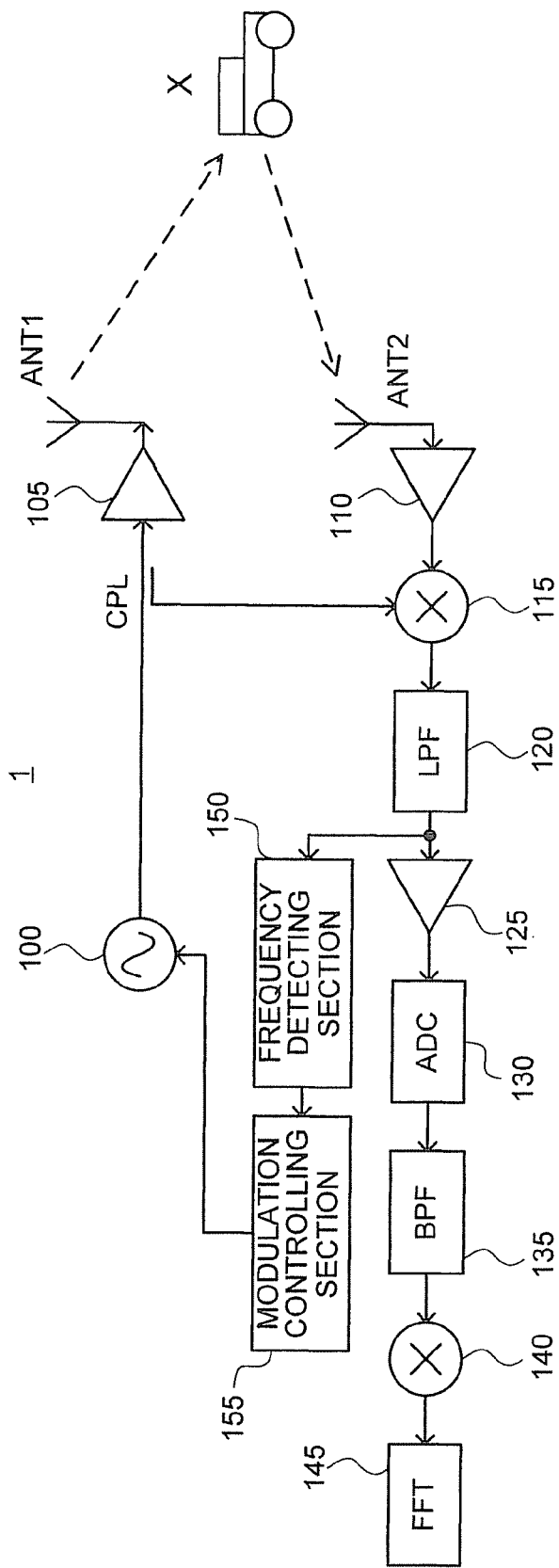
FIG. 1 is a block diagram showing a configuration of a radar device according to an embodiment of the present invention.

As shown in FIG. 1, a radar device 1 according to this embodiment includes an oscillating section 100, a power amplifier 105, a transmitting antenna ANT1, a receiving antenna ANT2, a high-frequency amplifier 110, a coupler CPL, a mixer 115, a low-pass filter 120, an amplifier 125, an analog-digital converter 130, a band-pass filter 135, a frequency converter 140, a Fourier transformer 145, a frequency detecting section 150, and a modulation controlling section 155.

The oscillating section 100 is, for instance, a voltage control oscillator capable of frequency-modulating an oscillation frequency and oscillates while periodically increasing/decreasing the oscillation frequency. Further, the oscillating section 100 is configured to be able to control a rate of change of the oscillation frequency per hour. The temporal rate of change of the oscillation frequency of the oscillating section 100 may be previously set or controlled from the outside. If a distance to an object to be detected, a cut-off frequency of flicker noise and the velocity of light are respectively set as r, fc and C, the temporal rate of change of the oscillation frequency of the oscillating section 100 is preferably set to be equal to or larger than (fc×C)/2r.

The power amplifier 105 is a transmitting amplifier amplifying a signal oscillated by the oscillating section 100 to predetermined electric power. The transmitting antenna ANT1 radiates a high-frequency signal amplified by the power amplifier 105 in the air. Since there is a need to make sufficient reflected signals arrive at the receiving antenna, the transmitting antenna ANT1 is preferably a high-gain antenna. From the oscillating section 100 to the transmitting antenna ANT1 form a transmitting section of the radar device 1.

The receiving antenna ANT2 receives a reflected signal transmitted from the transmitting antenna ANT1 and reflected by an object to be detected (or measured) X of the radar device 1. Since the receiving antenna ANT2 has to catch a weak reflected signal, it is preferably a high-gain antenna. Note that both the transmitting antenna ANT1 and the receiving antenna ANT2 may also be antennas capable of dynamically controlling a directivity. In this case, not only a distance to the object to be detected X but also a direction from an own position can be obtained.

The high-frequency amplifier 110 amplifies the reflected signal received by the receiving antenna ANT2 to a predetermined level. A radio wave frequency used for the radar device is very high (several tens GHz; millimetric waveband, for instance), so that an amplifier suitable for a high frequency such as an LNA is preferably used as the high-frequency amplifier 110. The high-frequency amplifier 110 is normally formed by using a semiconductor element, and becomes a source of generating the flicker noise.

The coupler CPL branches an output signal of the oscillating section 100 (stage before the input of the power amplifier 105). Note that although it is also possible to directly branch the output of the oscillating section 100 instead of using the coupler CPL, since the signal to be branched here is only required to have a certain level necessary to be used for the later-described mixer, it is preferable to use a method with less loss.

The mixer 115 multiplies the reflected signal amplified by the high-frequency amplifier 110 and the oscillation signal branched by the coupler CPL. If a frequency of the reflected signal and a frequency of the oscillation signal are respectively set as fr and ft, the mixer 115 outputs signals of fr+ft and |fr−ft|. The mixer 115 is normally formed by using a semiconductor element and becomes a source of generating the flicker noise. The low-pass filter 120 passes only a beat signal with a frequency of |fr−ft| out of the output of the mixer 115. In addition, the low-pass filter 120 also operates to remove a signal with a frequency equal to or larger than a folding frequency at the later stage of analog-digital conversion. Further, the amplifier 125 amplifies the beat signal to a level necessary for the later stage of analog-digital conversion. The amplifier 125 is normally formed by using a semiconductor element, and becomes a main cause of generating the flicker noise. However, in this embodiment, a main flicker noise component is already removed from the beat signal at the time when it is output from the mixer 115, as will be described later.

The analog-digital converter 130 A/D-converts the beat signal amplified by the amplifier 125. The band-pass filter 135 digitally removes the noise component of flicker noise and also digitally removes a high-frequency component which could not be completely removed by the low-pass filter 120 in the analog stage. As a result, the band-pass filter 135 takes out a signal component of the beat signal.

The frequency converter 140 converts the obtained signal component of the beat signal into a frequency suitable for the Fourier transform. The Fourier transformer 145 performs a calculation to calculate a distance to the object to be detected by calculating a time difference, based on the signal component of the beat signal, between the transmitted oscillation signal and the received reflected signal.

Further, the frequency detecting section 150 detects a frequency of the beat signal passed through the low-pass filter 120, and also detects presence/absence of a relative speed between the sensor device 1 and the object based on a frequency difference between two types of beat signals (when a transmitting frequency rises and when it falls). The modulation controlling section 155 controls the rate of change of the oscillation frequency of the oscillating section 100 based on the frequency of the beat signal detected by the frequency detecting section 150. Namely, the respective frequency detecting section 150 and modulation controlling section 155 collaborate to operate so that the frequency of the beat signal becomes large when it is equal to or smaller than the cut-off frequency of flicker noise, by enlarging the rate of change of the oscillation frequency of the oscillating section 100. Note that if the rate of change of the frequency is previously set to a value capable of removing the flicker noise, it is unnecessary to provide the frequency detecting section 150 and the modulation controlling section 155.

Figure 2A:
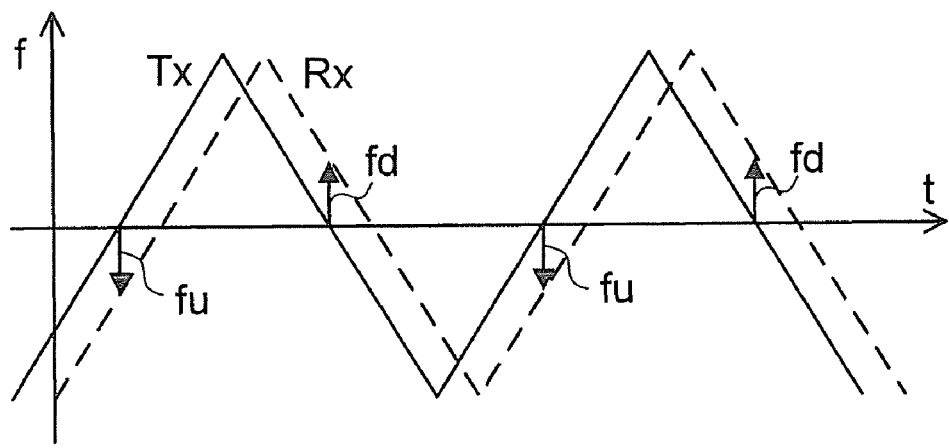
FIG. 2A is a view explaining a principle of operation of the radar device shown in FIG. 1.
Figure 2B:
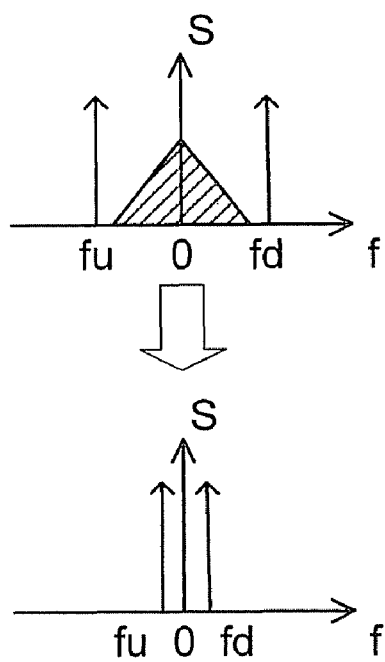
FIG. 2B is a view explaining the principle of operation of the radar device shown in FIG. 1.

Subsequently, an operation of the radar device 1 according to the embodiment shown in FIG. 1 will be described with reference to FIG. 2A and FIG. 2B.

The oscillating section 100 generates the transmitting signal by periodically increasing/decreasing the oscillation frequency. The coupler CPL branches a part of the transmitting signal as a local oscillation signal of the mixer 115, and the power amplifier 105 amplifies the transmitting signal generated by the oscillating section 100 to a predetermined level. The amplified transmitting signal is radiated into the air from the transmitting antenna ANT1.

The radiated transmitting signal is reflected by the object X and is returned to the radar device 1. The reflected signal reflected by the object X (received signal) is received by the receiving antenna ANT2 and input into the high-frequency amplifier 110. The high-frequency amplifier 110 amplifies the received signal received by the receiving antenna ANT2 to a predetermined level, and sends it to the mixer 115. The mixer 115 multiplies the received signal amplified by the high-frequency amplifier 110 and the transmitting signal branched by the coupler CPL, and outputs each of signals being the sum and the difference of the received signal frequency and the transmitting signal frequency. The low-pass filter 120 takes out the signal (=beat signal) being the difference of the received signal frequency and the transmitting signal frequency out of the output of the mixer 115, and also cuts a signal with a frequency equal to or larger than the folding frequency.

Here, a state of beat signal will be explained with reference to FIG. 2A. As shown in FIG. 2A, when a transmitting signal Tx is transmitted, a received signal Rx being the reflected signal arrives at the mixer 115 while being temporary delayed. Accordingly, when a change is made so that the frequency of transmitting signal becomes high (when the transmitting frequency rises), a beat signal with a frequency fu can be obtained, and when a change is made so that the frequency of transmitting signal becomes low (when the transmitting frequency falls), a beat signal with a frequency fd can be obtained. At this time, if the rate of change of the oscillation frequency of the oscillating section 100 is adjusted so that the frequencies fu and fd are generated at a frequency of, for instance, 1 MHz or larger where few influence of flicker noise exists, it becomes possible to remove the influence of flicker noise.

The beat signal output from the low-pass filter 120 is amplified to a predetermined level by the amplifier 125 and input into the analog-digital converter 130. The analog-digital converter 130 converts the beat signal into a digital signal. The band-pass filter 135 removes the noise component of flicker noise from the beat signal converted into the digital signal, and also takes out a beat component by removing a high-frequency component which cannot be completely removed by the low-pass filter 120 in the analog stage. The frequency converter 140 converts the taken-out beat component into a predetermined frequency, and the Fourier transformer 145 calculates the time difference between the transmitting/received signals by performing FFT processing on the converted beat component, to thereby calculate a distance to the object to be detected.

Respective states of beat signals before the A/D conversion and before the FFT processing will be described with reference to FIG. 2B. When the rate of change of the oscillation frequency of the oscillating section 100 is adjusted so that the beat frequency becomes equal to or larger than the cut-off frequency of flicker noise, the frequencies fu and fd of the beat signals are at positions out of the influence of flicker noise component (oblique line portion in the drawing), as shown in an upper stage of FIG. 2B. Thereafter, when the beat signal converted into the digital signal is further processed by the band-pass filter 135 and the frequency converter 140, it is possible to obtain beat signals with beat frequencies fu and fd being closer to a base band, as shown in a lower stage of FIG. 2B.

Here, the frequency detecting section 150 detects the frequency of beat signal from the low-pass filter 120. The modulation controlling section 155 monitors the frequency of beat signal detected by the frequency detecting section 150, and enlarges the temporal rate of change of the oscillation frequency of the oscillating section 100 when the radar device 1 is likely to be influenced by the flicker noise (when the frequency of beat signal is likely to become equal to or smaller than the cut-off frequency of flicker noise) due to a distance between the radar device 1 and the object X. According to this operation, it is possible to enlarge the beat frequencies fu and fd shown in FIG. 2A, which enables to prevent the influence of flicker noise. Note that there is no problem that the modulation controlling section 155 controls the oscillating section 100 only when the radar device 1 is likely to be influenced by the flicker noise or it constantly dynamically controls the oscillating section 100.

As described above, according to the radar device of this embodiment, since the beat frequency is set to be equal to or higher than the cut-off frequency of flicker noise, it is possible to avoid the influence of flicker noise that could not be completely removed by the conventional method, which is, for instance, an influence at the second stage of mixer, and especially, it is possible to improve the SNR when performing short-distance detection and the like.

Further, according to the radar device of this embodiment, since band-pass filter processing for extracting the beat signal is conducted at a digital signal processing stage, it is possible to eliminate an expensive IF band band-pass filter which is hard to be manufactured in the radar frequency band. Further, in the radar device of this embodiment, since the band-pass filter processing and frequency conversion processing are conducted at a digital signal processing stage, it is possible to reduce a circuit scale of an FFT processing circuit and power consumption by lowering an FFT point in the Fourier transform. Furthermore, according to the radar device of this embodiment, since the band-pass filter in the digital signal processing stage is used in addition to the low-pass filter in an analog signal processing stage, it is possible to alleviate the specification regarding the out-of-band attenuation amount of the low-pass filter in the analog signal processing stage, and to lower the order of the filter. This also enables a simplification of the circuit scale and low power consumption.

Figure 3:
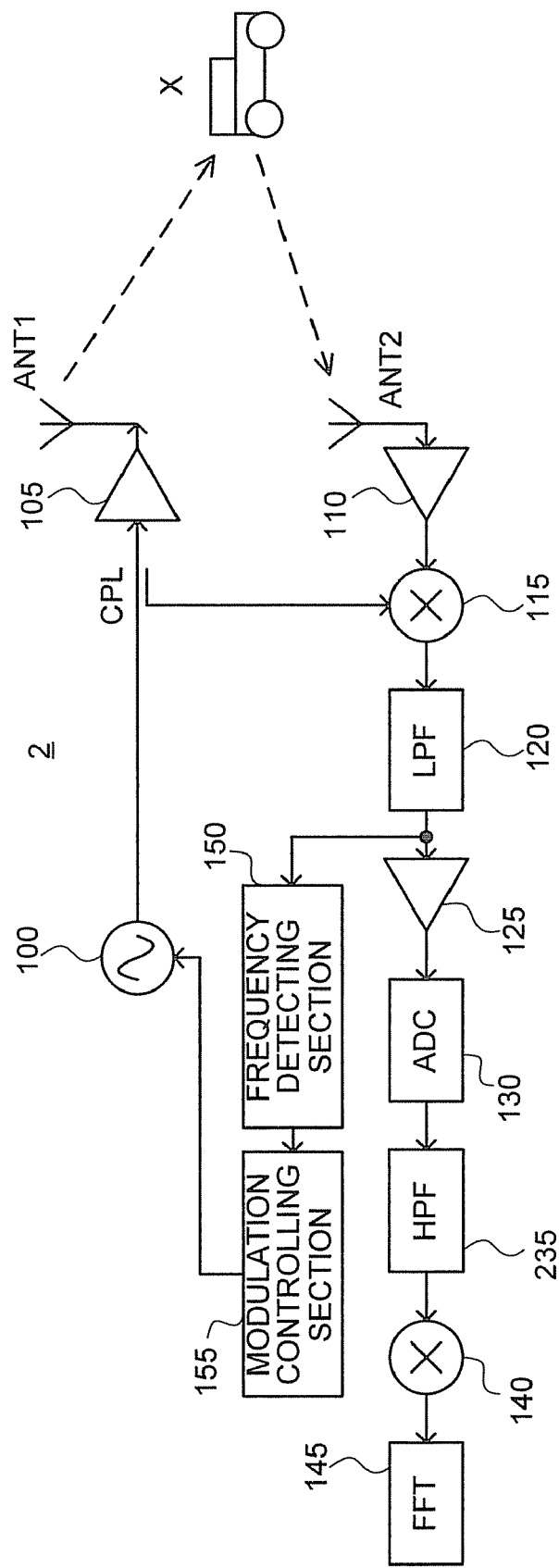
FIG. 3 is a view showing a modified example of the radar device according to the embodiment shown in FIG. 1.

Next, a modified example of the radar device according to the embodiment shown in FIG. 1 will be described with reference to FIG. 3. A radar device 2 shown in FIG. 3 corresponds to the radar device shown in FIG. 1 except that the band-pass filter 135 is replaced with a high-pass filter 235. In the following explanation, elements common to those in FIG. 1 are designated by the common reference numerals, and an overlapped explanation thereof will be omitted.

The high-pass filter 235 corresponds to the band-pass filter 135 shown in FIG. 1, and digitally removes a noise component of flicker noise. Normally, the low-pass filter 120 serves both for selecting a channel (extracting a difference between a received signal frequency and a transmitting signal frequency) and for suppressing alias (antialiasing) in the analog-digital converter 130. Here, if the design of low-pass filter 120 is made more precisely, and the low-pass filter 120 is designed to be able to perform a complete channel selection, it is possible to simplify a filtering in the digital signal processing stage. This modified example has a configuration in which the channel selection is performed only by the low-pass filter 120, and the noise component of flicker noise is digitally removed by providing the high-pass filter 235 in the digital signal processing stage.

According to this modified example, it is possible to reduce the circuit scale and the power consumption in the digital signal processing stage without deteriorating so much the characteristic.

Figure 4:
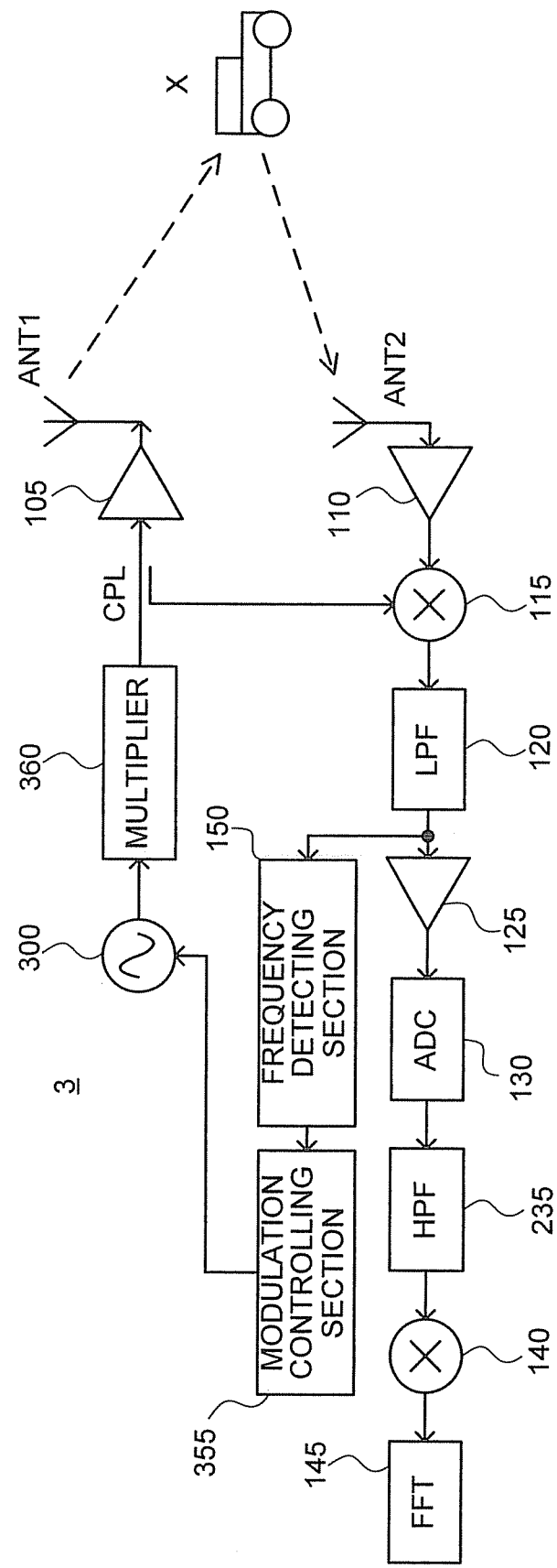
FIG. 4 is a view showing a modified example of the radar device according to the modified example shown in FIG. 3.

Next, a further modified example of the radar device according to the modified example shown in FIG. 3 will be described with reference to FIG. 4. A radar device 3 shown in FIG. 4 corresponds to the radar device shown in FIG. 3 to which a multiplier 360 is further provided. In the following explanation, elements common to those in FIG. 1 and FIG. 3 are designated by the common reference numerals, and an overlapped explanation thereof will be omitted.

The multiplier 360 is disposed between an oscillating section and the power amplifier 105, and multiplies an oscillation frequency of the oscillating section by two, for instance. Specifically, an oscillating section 300 shown in FIG. 4 oscillates at a frequency of ½ the frequency of the oscillating section 100 shown in FIG. 3, and a modulation controlling section 355 controls a rate of change at ½ of the modulation controlling section 155 shown in FIG. 3.

According to this modified example, since the multiplier is provided at a subsequent stage of the oscillating section, it is possible to lower the oscillation frequency of the oscillating section and to simplify the configuration of the oscillating section. Further, when a gate length in a CMOS process is long and a cut-off frequency cannot be sufficiently obtained, it becomes hard that the oscillating section directly oscillates a signal with a transmitting frequency, but, according to this modified example, it becomes possible to remarkably reduce the oscillation frequency.

Figure 5:
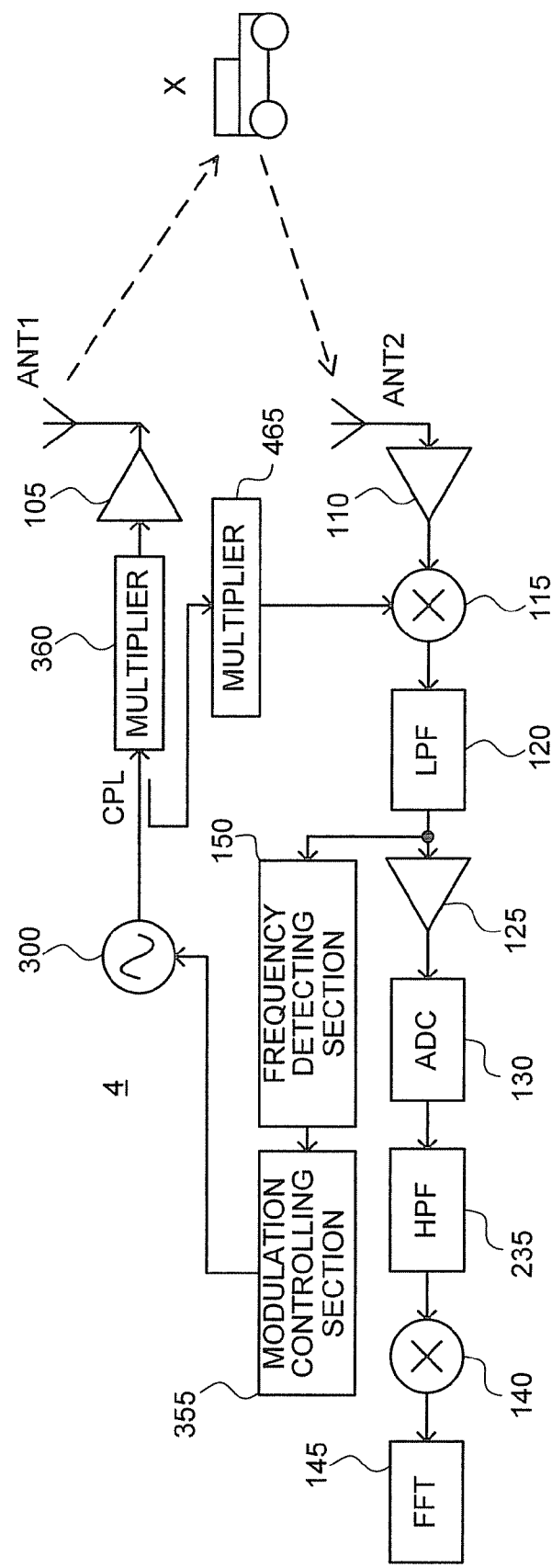
FIG. 5 is a view showing a modified example of the radar device according to the modified example shown in FIG. 4.

Moreover, a further modified example of the radar device according to the modified example shown in FIG. 4 will be described with reference to FIG. 5. A radar device 4 shown in FIG. 5 corresponds to the radar device shown in FIG. 4 to which a multiplier 465 is further provided. In the following explanation, elements common to those in FIG. 1, FIG. 3 and FIG. 4 are designated by the common reference numerals, and an overlapped explanation thereof will be omitted.

The multiplier 465 is disposed between the coupler CPL and the mixer 115, and multiplies an oscillation frequency of the oscillating section by two, for instance. At this time, the coupler CPL is designed to branch the transmitting signal from between the oscillating section 300 and the multiplier 360, as shown in FIG. 5. According to this modified example, it becomes possible to shorten a high-frequency signal line through which a final transmitting signal with high frequency passes, resulting that an attenuation of signal can be suppressed.

Subsequently, the control of rate of change of the oscillation frequency of the oscillating section in the radar devices 1 to 4 of this embodiment and the modified examples will be described in detail with reference to FIG. 6A to FIG. 6D.

Figure 6A:
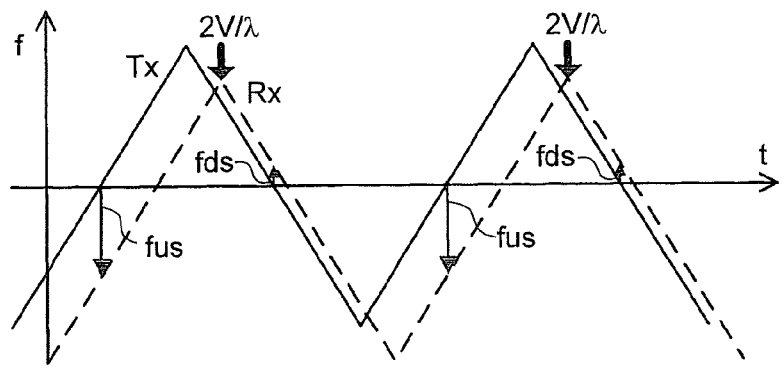
FIG. 6A is a view showing a principle of generating a beat signal when there exists a relative speed between a radar device and an object X.
Figure 6B:
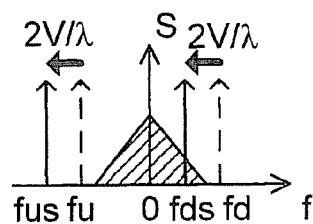
FIG. 6B is a view showing a relation between the beat signal and a flicker noise in a case shown in FIG. 6A.

As shown in FIG. 6A, if a wavelength of a transmitting signal with respect to a relative speed V between the radar devices 1 to 4 of this embodiment and the modified examples and the object, is set as $\lambda$, fus and fds being a rising side and a falling side of the beat frequency are generated at $fu+2V/\lambda$ and $fd-2V/\lambda$, respectively. If an absolute value of the relative speed V is large at this time, fds ($=fd-2V/\lambda$) is generated at a low frequency region (oblique line portion in the drawing) where an influence of flicker noise is large, as shown in FIG. 6B. For example, if the relative speed V is 100 km/h, the transmitting frequency is 77 GHz, and fu and fd are respectively 1 MHz, fds ($=fd-2V/\lambda$) is generated at a further low frequency side as much as about 14 kHz from the cut-off frequency of flicker noise.

Figure 6C:
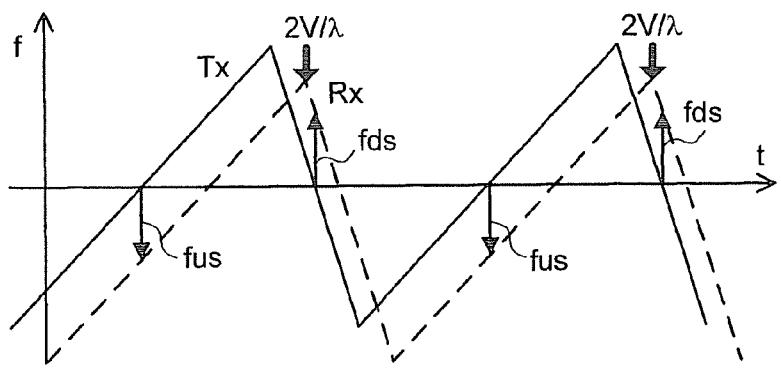
FIG. 6C is a view showing operations of the radar devices of the embodiment and the modified examples when there exists a relative speed between the radar devices and the object X.
Figure 6D:
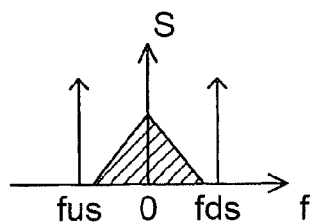
FIG. 6D is a view showing a relation between a beat signal and a flicker noise in a case shown in FIG. 6C.

Accordingly, when the frequency detecting section 150 detects the existence of relative speed V (this only requires to detect that fus and fds are largely different), the modulation controlling section 155 of the radar devices according to this embodiment and the modified examples separately changes respective absolute values of the rate of change when the transmitting frequency increases and when it decreases, and controls so that the beat signal frequencies fus and fds become about the same, as shown in FIG. 6C. As a result, fus at the rising side of frequency where the rate of change of the oscillation frequency decreases becomes small, and instead of this, fds being the falling side of frequency where the rate of change of the oscillation frequency increases can be enlarged. Namely, fus ($=fu+2V/\lambda$) and fds ($=fd-2V/\lambda$) can be generated at frequencies being close to fu and fd, respectively, where the relative speed is 0 (zero).

FIG. 6A to FIG. 6D show cases where the relative speed is negative, but also in a case where the relative speed is positive, $fu-2V/\lambda$ and $fd+2V/\lambda$ can be respectively generated at frequencies close to fu and fd, in the same manner.

As described above, according to the radar devices 1 to 4 according to this embodiment and the modified examples, since the rate of change when the frequency of the oscillating section rises and when it falls is separately changed in accordance with the relative speed between the object and the radar device, it is possible not only to avoid the influence of flicker noise but also to enlarge the range of the relative speed in which the search can be conducted. Further, since it is possible to prevent to enlarge a pass band of a receiving-side filter such as the low-pass filter, the mixer, the analog-digital converter and the like, the simplification of circuit configuration and the low power consumption can be realized.

It should be noted that the present invention is not limited only to the aforementioned embodiment and its modified examples. Although the configuration of the above modified example is further changed based on the configuration of the modified example shown in FIG. 3, it may changed based on the configuration of the embodiment shown in FIG. 1. In like manner, the present invention is not limited to the above-described embodiments as they are, but may be embodied with components being modified in a range not departing from the contents thereof at the stage of implementation. Further, various inventions can be formed by correctly combining a plurality of components disclosed in the above-described embodiments. For example, some of all the components shown in the embodiments may be deleted. Further, components ranging across different embodiments can be combined correctly. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radar device, comprising:
   a transmitter to transmit a transmitting signal whose frequency is periodically increased/decreased at a predetermined rate of change;
   a mixer to generate a beat signal by multiplying a received signal being transmitted by the transmitter and then reflected back from an object to be detected and the transmitting signal;
   a frequency detector to detect a frequency of the beat signal; and
   a controller to control the rate of change of the frequency of the transmitting signal so that the frequency of the beat signal detected by the frequency detector becomes equal to or larger than a cut-off frequency of a flicker noise caused by the mixer,
   wherein if a distance to the object to be detected, the cut-off frequency of flicker noise and the velocity of light are respectively set as r, fc and C, the rate of change of the frequency of the transmitting signal is equal to or larger than $(fc \times C)/2r$.

2. The device according to claim 1, further comprising:
   an A/D converter to perform A/D-conversion of the beat signal generated by the mixer;
   a filter to remove a component being equal to or smaller than the cut-off frequency of the flicker noise included in the beat signal converted into a digital signal by the A/D converter; and
   a calculator to calculate the beat signal outputted by the filter for generating distance data to the object to be detected.

3. The device according to claim 1,
wherein the frequency detector further detects presence/absence of relative speed between the radar device and the object to be detected; and
the controller controls, when the relative speed is detected by the frequency detector, the rate of change of the frequency so that the rate of change differs between when the frequency of the transmitting signal rises and falls.

4. The device according to claim 1,
wherein the mixer is formed of a CMOS semiconductor element.

5. A control method of a radar device, comprising,
transmitting a transmitting signal whose frequency is periodically increased/decreased at a predetermined rate of change;
generating a beat signal by multiplying a received signal being transmitted as the transmitting signal reflected back from an object to be detected and the transmitting signal using a mixer;
detecting a frequency of the beat signal; and
controlling the rate of change of the frequency of the transmitting signal so that the frequency of the beat signal becomes equal to or larger than a cut-off frequency of a flicker noise caused by the mixer,
wherein if a distance to the object to be detected, the cut-off frequency of flicker noise and the velocity of light are respectively set as r, fc and C, the rate of change of the frequency of the transmitting signal is equal to or larger than (fc×C)/2r.

6. A radar device, comprising,
an oscillator to oscillate a transmitting signal whose frequency is periodically increased/decreased at a predetermined rate of change;
a transmitter to transmit the transmitting signal;
a mixer to generate a beat signal by multiplying a received signal being transmitted by the transmitter and reflected back from an object to be detected and the transmitting signal; and
wherein the oscillator oscillates the transmitting signal at a rate of change at which the frequency of the beat signal becomes equal to or large than a cut-off frequency of a flicker noise caused by the mixer, and
wherein if a distance to the object to be detected, the cut-off frequency of flicker noise and the velocity of light are respectively set as r, fc and C, the rate of change of the frequency of the transmitting signal is equal to or larger than (fc×C)/2r.

* * * * *